(12) United States Patent
Griessel

(10) Patent No.: US 12,066,313 B1
(45) Date of Patent: Aug. 20, 2024

(54) NON-INVASIVE WELL LEVEL MONITORING AND MAINTENANCE

(71) Applicant: Richard Eugen Griessel, Derry, NH (US)

(72) Inventor: Alexander Robert Griessel, Derry, NH (US)

( * ) Notice: Subject to any disclaimer, the term of this patent is extended or adjusted under 35 U.S.C. 154(b) by 423 days.

(21) Appl. No.: 16/229,553

(22) Filed: Dec. 21, 2018

Related U.S. Application Data

(60) Provisional application No. 62/610,199, filed on Dec. 24, 2017.

(51) Int. Cl.
*G01F 23/00* (2022.01)
*E03B 3/12* (2006.01)
*E03B 3/15* (2006.01)
*E03B 5/04* (2006.01)

(52) U.S. Cl.
CPC ............... *G01F 23/00* (2013.01); *E03B 3/12* (2013.01); *E03B 3/15* (2013.01); *E03B 5/04* (2013.01)

(58) Field of Classification Search
CPC ... G01F 23/00; E03B 3/12; E03B 3/15; E03B 5/04
See application file for complete search history.

(56) References Cited

U.S. PATENT DOCUMENTS

| | | | | |
|---|---|---|---|---|
| 9,709,431 | B1* | 7/2017 | Kinney | G08B 21/20 |
| 10,699,551 | B1* | 6/2020 | Steiger | G08B 21/20 |
| 2008/0067116 | A1* | 3/2008 | Anderson | G01F 1/80 |
| | | | | 702/45 |
| 2010/0012332 | A1* | 1/2010 | Fisher | F16K 37/0083 |
| | | | | 169/24 |
| 2012/0001966 | A1* | 1/2012 | Hoisington | B41J 2/16579 |
| | | | | 347/6 |
| 2012/0044600 | A1* | 2/2012 | Roscoe | H02H 1/0015 |
| | | | | 361/18 |
| 2013/0018605 | A1* | 1/2013 | Peterson | E21B 47/008 |
| | | | | 73/290 R |
| 2014/0212264 | A1* | 7/2014 | Zimmerman | F04D 15/0066 |
| | | | | 415/1 |
| 2015/0168495 | A1* | 6/2015 | Bickel | G01R 31/343 |
| | | | | 702/60 |
| 2017/0226719 | A1* | 8/2017 | Epp | E03B 5/02 |
| 2018/0262131 | A1* | 9/2018 | Russick | B63B 13/00 |

OTHER PUBLICATIONS

Yuliza, Salam, Amri, Atmajati, Hapidin, Meilano, Munir, Abdullah, Khairurrijal, "Characterization of a Water Level Measurement System Developed Using a Commercial Submersible Pressure Transducer" Aug. 29, 2016, International Conference on Instrumentation, Control and Automation (ICA), pp. 99-102. (Year: 2016).*

* cited by examiner

*Primary Examiner* — Mohamed Charioui
*Assistant Examiner* — Christine Y Liao
(74) *Attorney, Agent, or Firm* — Lambert Shortell & Connaughton; David J. Connaughton, Jr.; Justin P. Tinger

(57) ABSTRACT

The present method and apparatus use information on the voltage V and the current I drawn by a pump motor to determine the water or liquid level height H in a well in which the pump is employed. In typical examples, the power of the motor can be related to the pressure and the fluid flow, and equations can then be used to relate fluid flow Q1 to fluid height H in the well.

Glossary for FIG
Calc.=Calculation
Meas.=Measurement
Detr.=Determines
Avg.=Average (Continued)

Param.=Parameter
Calib.=Calibration
⌘=command
CD=Control device (example smart phone).

20 Claims, 16 Drawing Sheets

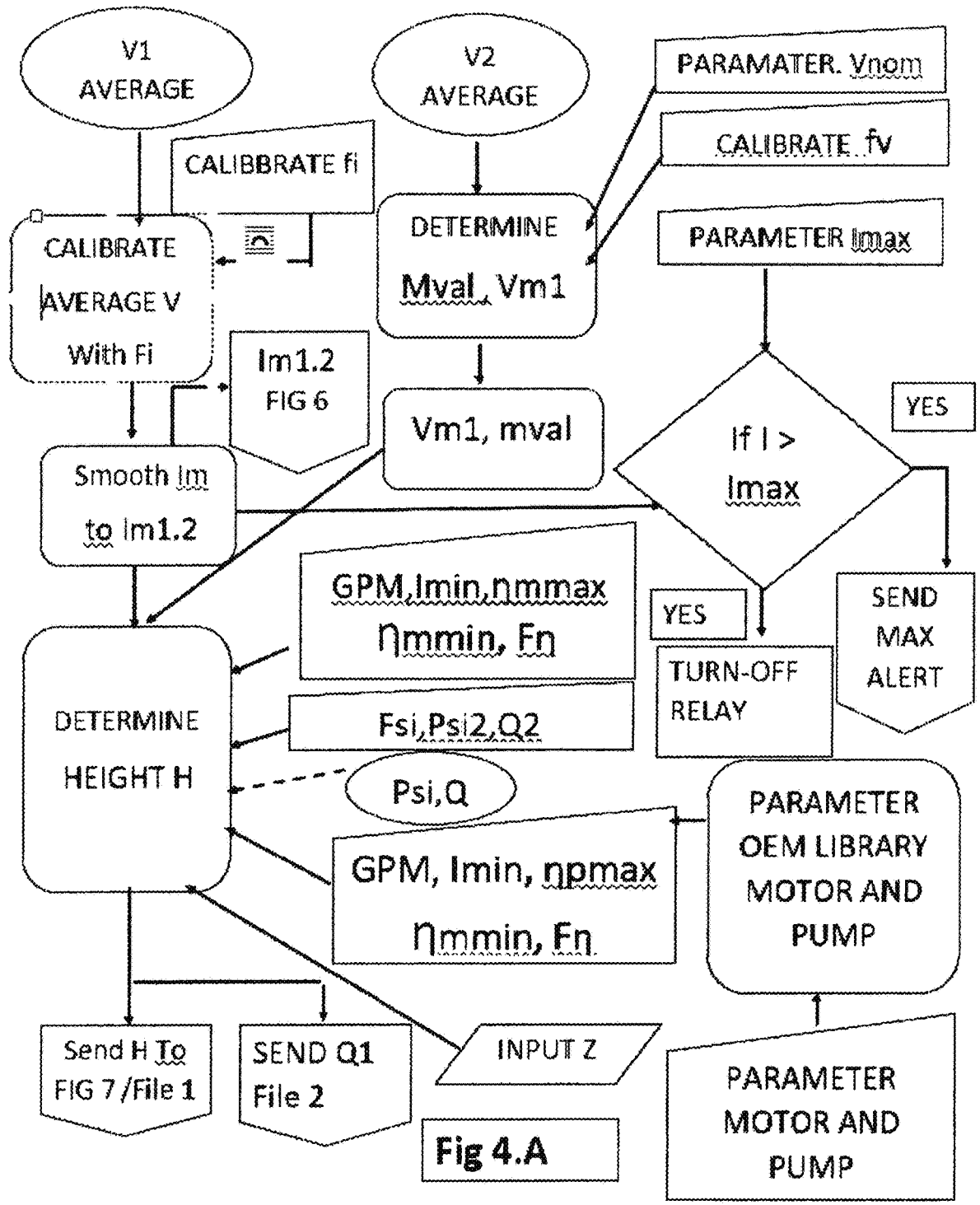
Fig 4.A

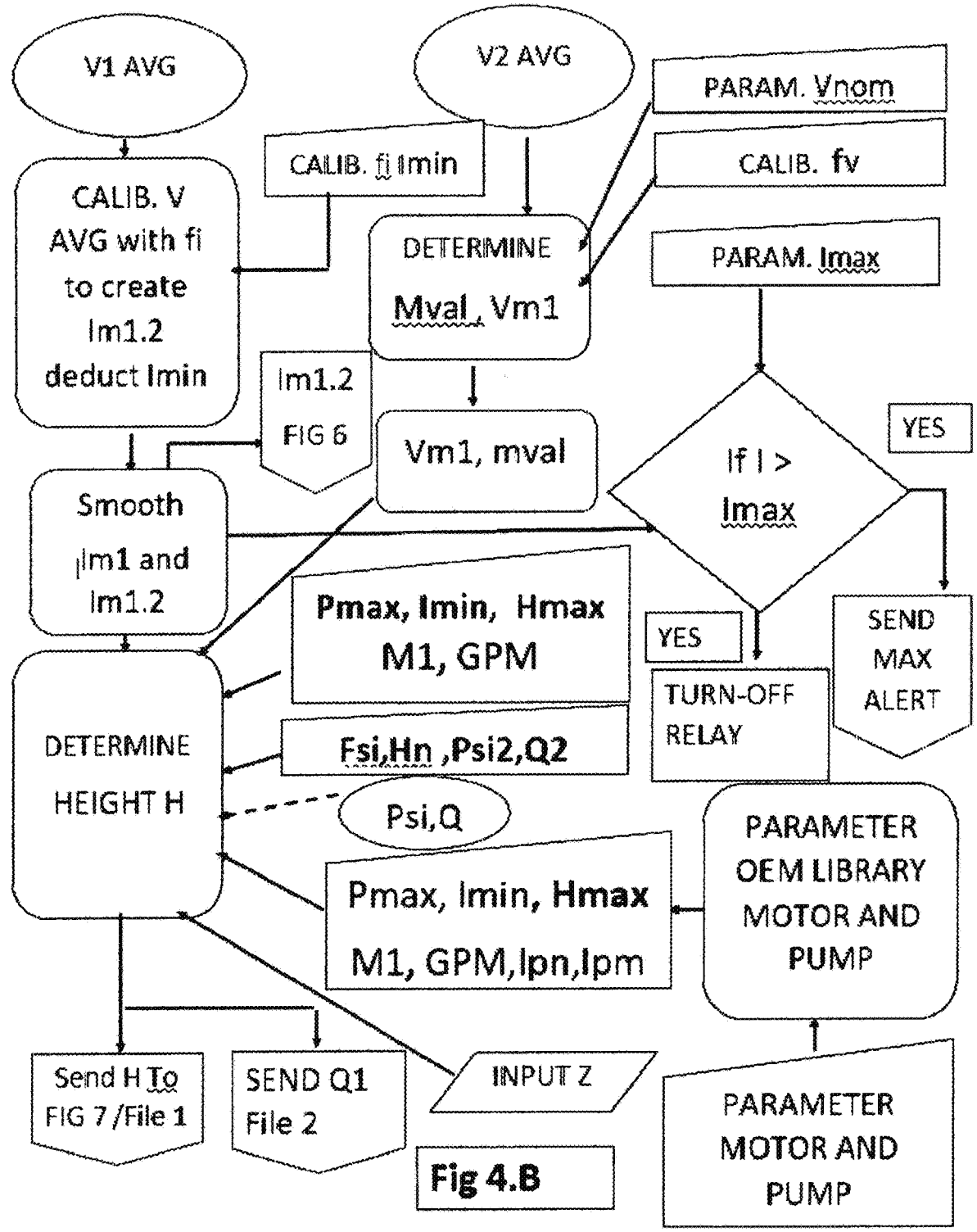
Fig 4.B

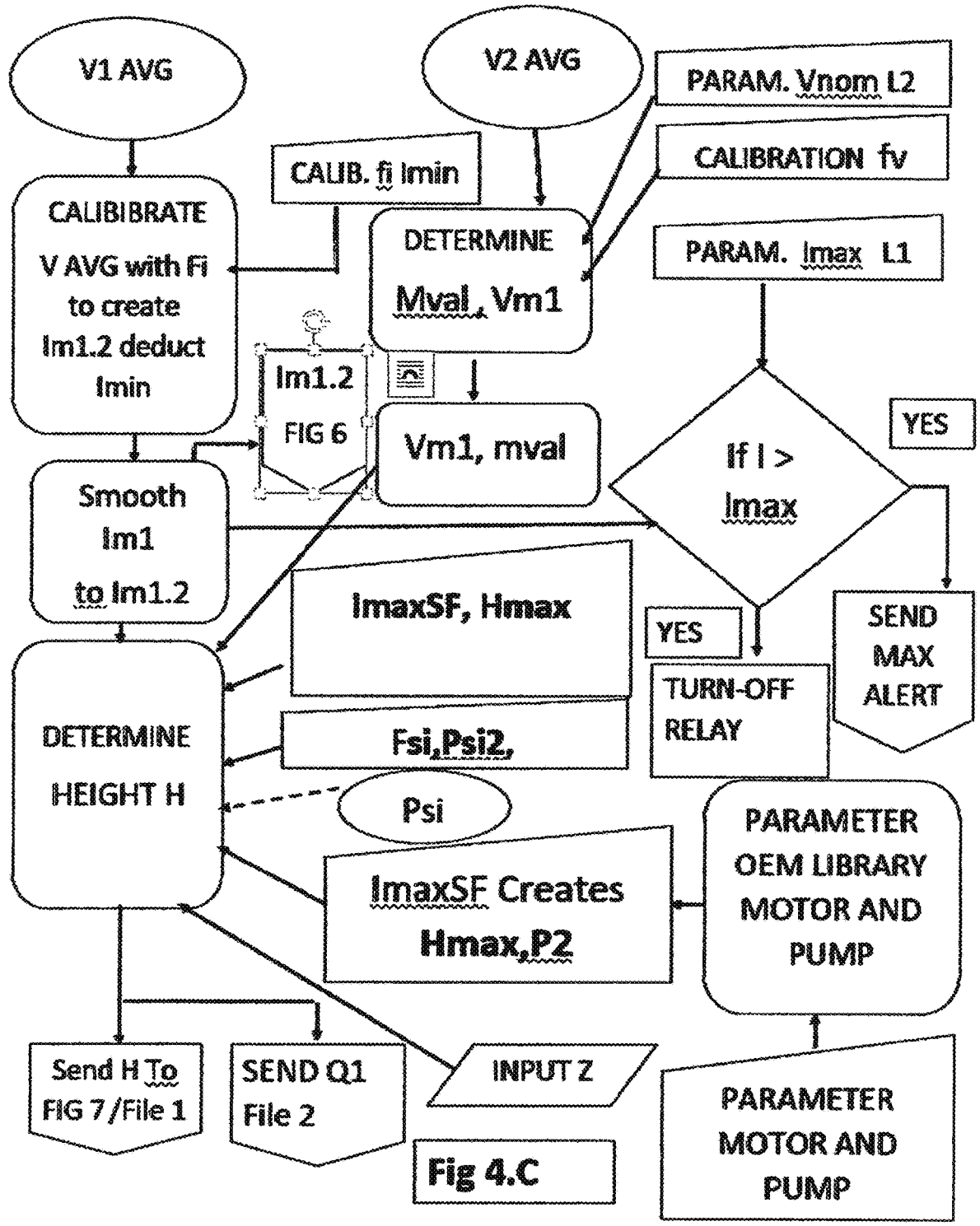
Fig 4.C

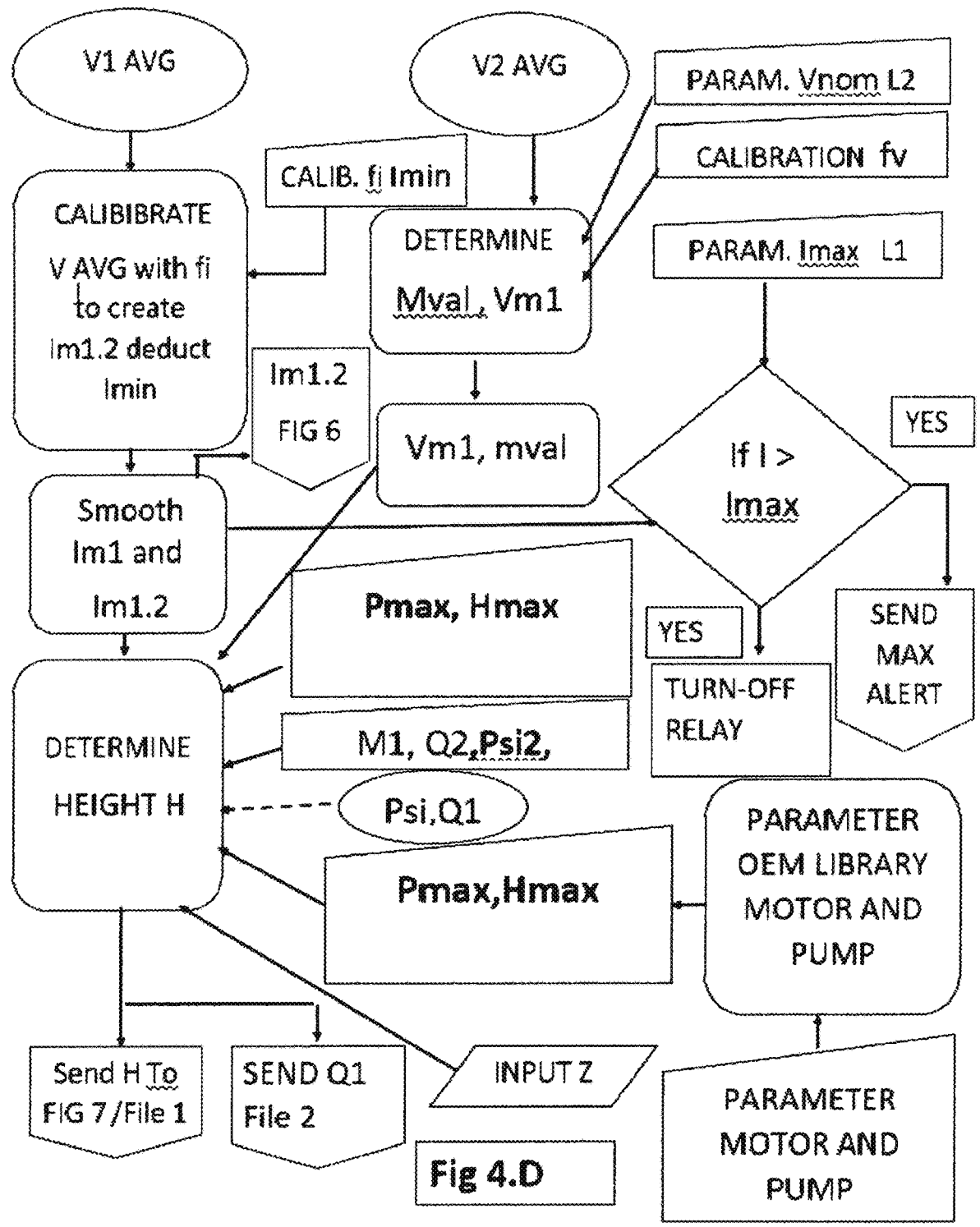
Fig 4.D

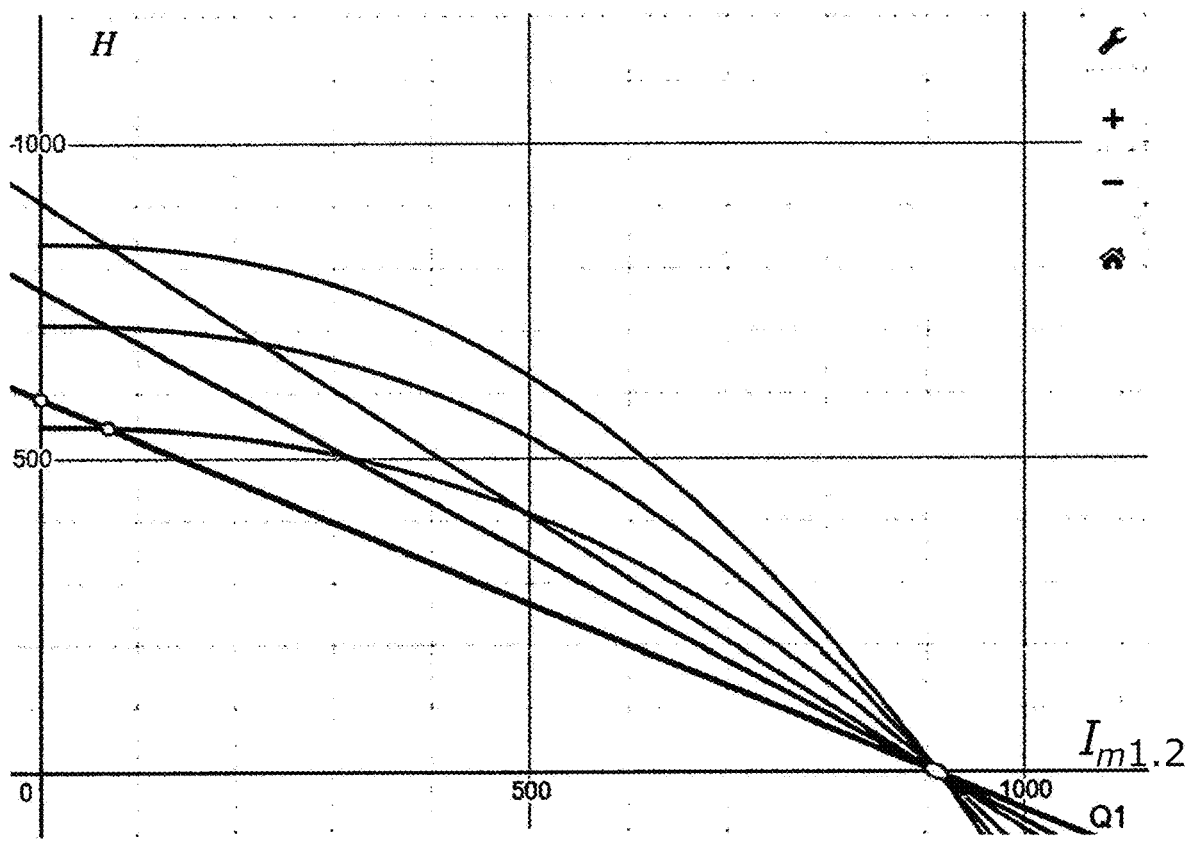

$$H = \left(840 \cdot \frac{26}{26}\right) - \left(\frac{840 \cdot Q_1^{2.3}}{16\,000 \cdot 400\left(\frac{26}{26}\right)^4 \cdot \left(\frac{26}{26}\right)^3}\right)$$

$$H = \left(840 \cdot \frac{22}{26}\right) - \left(\frac{840 \cdot Q_1^{2.3}}{16\,000 \cdot 400\left(\frac{26}{22}\right)^4 \cdot \left(\frac{22}{26}\right)^3}\right)$$

$$H = \left(840 \cdot \frac{17}{26}\right) - \left(\frac{840 \cdot Q_1^{2.3}}{16\,000 \cdot 400\left(\frac{26}{17}\right)^4 \cdot \left(\frac{17}{26}\right)^3}\right)$$

$$H = \left(840 \cdot 1.08 - I_{m1.2}\right) \cdot 1 \cdot \frac{26}{26}$$

$$H = \left(840 \cdot 1.08 - I_{m1.2}\right) \cdot 1 \cdot \frac{22}{26}$$

$$H = \left(840 \cdot 1.08 - I_{m1.2}\right) \cdot 1 \cdot \frac{17}{26}$$

FIG 13

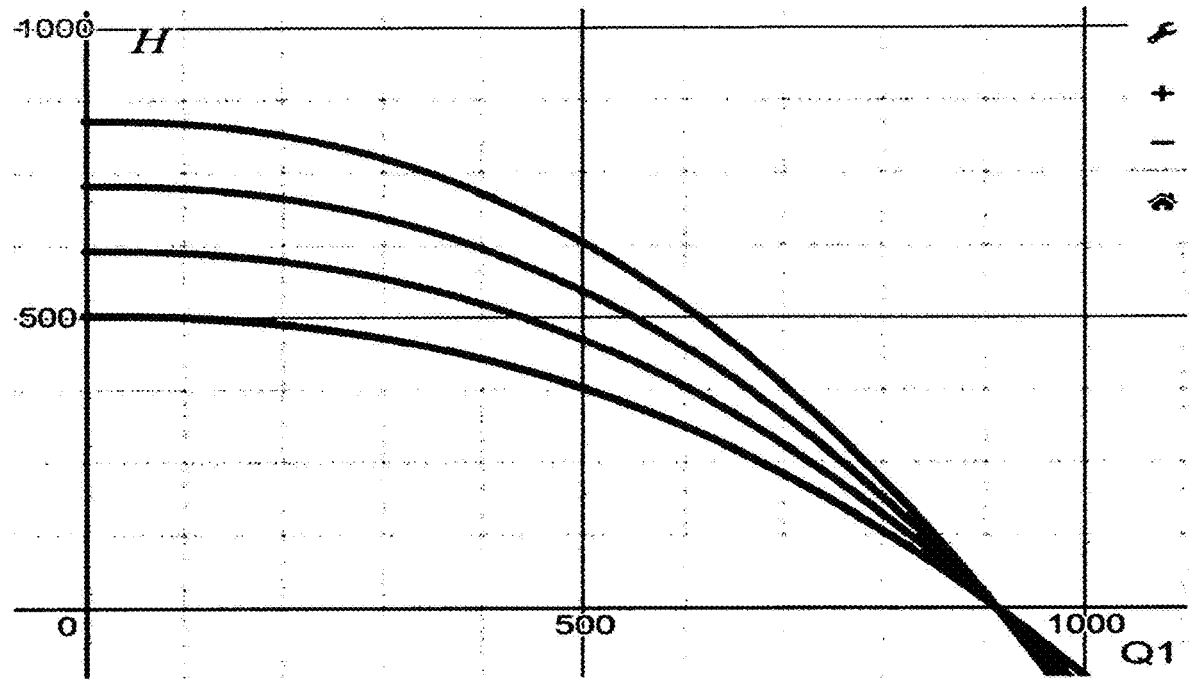
$$H = 840 \cdot \frac{1500}{1500} - \frac{840 \cdot 1500 \cdot Q_1^{2.3}}{16\,000 \cdot 400 \cdot 1500}$$
$$H = 840 \cdot \frac{1300}{1500} - \frac{840 \cdot 1300 \cdot Q_1^{2.3}}{16\,000 \cdot 400 \cdot 1500}$$
$$H = 840 \cdot \frac{1100}{1500} - \frac{840 \cdot 1100 \cdot Q_1^{2.3}}{16\,000 \cdot 400 \cdot 1500}$$
$$H = 840 \cdot \frac{900}{1500} - \frac{840 \cdot 900 \cdot Q_1^{2.3}}{16\,000 \cdot 400 \cdot 1500}$$
FIG 14

NON-INVASIVE WELL LEVEL MONITORING AND MAINTENANCE

FIELD OF INVENTION

This invention relates to a method and system for the measuring of the liquid table and the operation of liquid wells, being particularly well-suited to residential and light commercial water wells.

BACKGROUND

Residential and light commercial water wells typically employ a submersible pump connected to a well pump motor at the bottom of the well, which pump the water up to a pressure tank. Such wells are typically operated without any knowledge of the real capacity of the well, as the measurement technology for monitoring the fluid level is expensive, inconvenient to install, requires opening of well and requires maintenance.

The key issue is that for many typical 5" to 7" diameter, 100' to 900' deep wells, such as wells for home owners, there are few reliable methods of measuring the actual water table, especially over the course of a year. In addition, the well owner needs such monitoring system to step into action when the well reaches water tables that can decrease performance of the well over time or, in the worst case, have the pump running when the well is completely dry. Running the pump when the well is dry leads to over-heating of motor (as well as over-heating the water pipe, if fabricated of plastic material). Another area that is critical is when the well is very low; in this situation, there is very little water pressure from the water-table to help the pump create the pressure to fill the pressure tank and thus reach the necessary pressure for the pressure relay to turn-off the pump motor. This can lead to the pump being on for hours before the trickle of water pushing into the pressure tank is sufficient to fill the pressure tank, creating enough pressure to activate the pressure relay which disconnects the pump motor. The main reason here is that the refill rate of the well can be between 30 minutes to 12 hours or longer. This not only results in a degradation of the motor and the pump, but a waste of electrical energy.

Several of water measurement devices are currently available to continuously measure and record water levels, but all suffer deficiencies. There are devices that insert a capacitive measurement device into the well; however, the capacitive measurement is subject to changes as the dielectric changes or the water salination changes depending on the time of the year. There are devices that insert a sonar measurement device into the well; stray reflections have shown to decrease the reliability of the reading. Ultrasonic measurement devices depend on the velocity of sound, and therefore are also sensitive to air temperature, humidity, and altitude. For ground water wells that are considered deep, ultrasonic measurement methods are considered inadequate. There are also measurement devices available that use microwaves, but these require considerably more power than ultrasonic devices, and are also sensitive to different stray reflections from well to well. There are devices that insert a flotation measurement device into the well; these floatation devices become unreliable over time as they stick to the wall caused by friction or become waterlogged. There are also air pressure methods to determine the water level in the well and also moisture detection methods. All these additional measurement devices added into the well are susceptible to wear and tear which can require costly repair.

One significant disadvantage of all these methods is that they require opening the well and adding a measurement device. Opening the well usually requires considerable support from an expert to correctly install the measurement device, as well as to avoid contamination of the well during and after such service and retrofit.

US. Publication No. 20140009302 teaches a sonar sensor array placed in the well head. The sonar measurement methods can be inaccurate due to stray reflections increase have shown to decrease the reliability of the reading. Ultrasonic measurement devices depend on the velocity of sound and therefore are also sensitive to air temperature, humidity, and altitude and shape and depth of the well. This invention does not include any form of well management based on the measurement information obtained. This method requires opening the well and adding a measurement device. Opening the well usually requires considerable support from an expert to correctly install the measurement device as well as decontamination of the well after such service and retrofit.

Patent WO 2005008188 A2 is based on a capacitor placed in the length of the well. The capacitance measurement methods can be inaccurate due to change of the water conductivity over the course of a year and changes in the dielectric material over time. This invention does not include any form of well management based on the measurement information obtained. This method requires opening the well and adding a measurement device. Opening the well usually requires considerable support from an expert to correctly install the measurement device as well as decontamination of the well after such service and retrofit.

SUMMARY

Applicant has developed a novel approach to measuring the liquid level of the well, which does not require opening of the well, reducing cost. This approach to monitoring is also beneficial in allowing the pump motor to be operated with the aid of relays in an efficient manner based on real time information on the water table and pressure. Using the present approach to monitoring also allows diagnosing failure modes of the pump and motor of the well system.

The present method and apparatus use information on the voltage V and the current I drawn by the pump motor to determine the water or liquid level height H in a well. Using the affinity laws, the power of the motor can be related to the pressure and the fluid flow. A set of equations are then used which relate fluid flow Q1 to fluid height H, information on the pump and well depth can be used to define a relationship of the current I to the fluid flow Q1, and this relationship can then be used to relate the motor current to the fluid height. Three different analysis schemes are discussed for fixed-speed pumps, depending on what information on the pump is readily available to the user. In the case of variable-speed motors used in constant pressure systems, defining this relationship may require a signal from the pressure sensor of the system, using the current to modify the height equation $H=f(Q1)$, where Q1 is derived from the pressure sensor and the current serves to adjust the operating point in the $H=f(Q1)$ curves (provided by Equation 4.D.1., discussed in greater detail below). In all cases, because the variations in current due to change in the height H are typically a small portion of the total current, the current measurements may need to be averaged over time or otherwise processed to eliminate transient variations.

The present apparatus and method allow continuously measuring the level of water or liquid in the well, since the measurement of current, voltage and accepting existing pressure or flow signals can be implemented with an apparatus which is inexpensive to produce and to maintain. This approach also provides experts not only with a measurement and management apparatus and method to obtain additional information comprising water or liquid table of the well, but also information on the efficiency of the pump and motor to allow for detailed, fact-based decisions rather than approximation and experience-based decisions. The present method and apparatus allow determining the liquid level of a well without opening the well and thus risking contamination of the well or requiring a lengthy chemical decontamination treatment of the well; this allows the apparatus to be readily installed by relatively untrained persons, and greatly reduces the cost and effort of installation.

The connection of this well monitoring system can be achieved by opening up one phase to the motor and bridging in the well measurement and management device. In addition, one ground wire needs to be attached to well measurement and management device. The simplicity of connecting outside the well without opening the well and ability to use the information obtained not only from the water table, but to manage the operation intelligently in critical operating conditions is a significant difference to all previous methods. The ability to turn-on/turn-off the motor of the pump in the well in response to minimum liquid table levels reduces energy consumption and avoids damage from running the pump when dry. The present system also provides the ability to charge the pressure tank in the system in an adequate time frame to reduce energy waste in the event when the liquid levels slow down this charging of the pressure tank.

During the dry season, the well capacity is limited and changes in the course of a season. Today's methods well documented in the art require methods of opening the well and installing an additional measurement device in the well.

While the discussion herein addresses water wells for residences and small facilities, the approach can be adapted for other uses, such as for oil wells, and for facilities of larger sizes where there is an advantage to providing fluid table measurements without expensive equipment and/or access to the well.

BRIEF DESCRIPTION OF THE DRAWINGS

The features and advantages of the present method and apparatus will be apparent from the following more particular description of examples as illustrated in the accompanying drawings, in which like reference characters refer to the same parts throughout the different views. The drawings are not necessarily to scale, emphasis instead being placed upon illustrating the principles of the method and apparatus.

FIG. 3A describes the process to find the Root-Mean-Square (RMS) value of one-half cycle of an alternating signal. First, a defined number of measurements are taken from the Signal A0 and stored. From the first zero-crossing found in the measurements until the next zero-crossing, each measurement is squared and added onto a Sum. After the second zero-crossing, the Sum is divided by the number of measurements between the zero-crossings, giving the Mean. The value RMS is then the square root of the Mean. The process in 3B. is used to eliminate error due to noise in the Signal A0 by taking a defined number of RMS values and one previous V1Average, and entering the values into a smoothing function.

FIG. 4A-4D are flow charts showing four examples of schemes for analyzing the current value obtained from the transformation shown in FIGS. 3A & 3B; the schemes differ in the information on the pump that is available. In all cases, the flow chart shows the voltage V1 from the current sensor transformed into a value Im1 with the calibration factor fi and the voltage sensor voltage V2 being transformed by the calibration factor fv to the measured voltage Vm1 used for the calculation of H. Also using Vm1 and the nominal voltage value the current and power correction factor Mval is created. In addition, each flow chart shows the ability to add overcurrent protection for a user set Imax trip setting. In the overcurrent event the relay disconnects the motor from the grid supply. After the determination of the water table H and flow Q1, these values are sent to the files from which the user can down load the information. FIGS. 4A-4C illustrate schemes suitable for use with fixed-speed pumps, while FIG. 4D illustrates a scheme suitable for use with variable-speed pumps.

FIG. 4A shows a scheme in which the water table value H is determined using the EQ 4.A.1 (discussed below), and can be used where information on the efficiency of the pump and the flow at a defined pump power are available. For current pump models, such information may be available from the manufacturer; if not, it can be determined experimentally for each different pump model.

FIG. 4B illustrates a scheme which takes advantage of the intrinsic influence of key parameters on the shape of the water table versus flow curves (as shown in FIG. 11). The advantage of using the 4B approach is that the parameters used are typically known or more readily accessible to the operator than the input parameters used in the scheme described for FIG. 4A. The water table value H of the FIG. 4B is determined using the EQ 4.B.1 (discussed below).

FIG. 4C illustrates a scheme which transforms the grid voltage corrected current measurement into a water table value H as shown in the EQ4.C.1 (discussed below). This method could be very valuable for older wells where information on the pump and other parameters is no longer is available.

FIG. 4D illustrates a scheme suitable for use with variable-speed pumps, and is similar to the scheme illustrated in FIG. 4B, as it uses the same height versus flow curve. However, the use of a variable-speed pump requires changing this curve in accordance with the current and voltage. In the scheme shown in FIG. 4B, the flow Q1 can also be determined by the current or the pressure or a flow sensor. In the method shown in FIG. 4D, the flow Q1 is determined with the pressure as this case always require a pressure sensor for the variable speed operation, and then the current measurement is used for adjusting the power level of the H=f(Q1) curve. FIG. 4D shows the steps for this method, showing an example of a method for use in the event a variable speed inverter is used to control the frequency of the pump motor.

FIG. 13 shows a comparison of the pump curve for 0.75 HP to 1.5 HP motor for same nominal flow levels using method 4.B and 4. C. The straight curves are the curves of the 4.C method. In the last three equations x=I measured and Imaxsf=840 mA as X-axis is in [mA] and Y-axis would be in [feet]. Thus Fh=1 in this example.

FIG. 14 shows as an example the adaptable pump curve for 1.5 HP motor for different power levels during the drawdown of a well at constant pressure and flow. In this example k is set at 2.3, which replicates the curves of the manufacturers closely. Y-axis is in feet and the X-axis is in [GPM*100].

DETAILED DESCRIPTION

Figure 1:
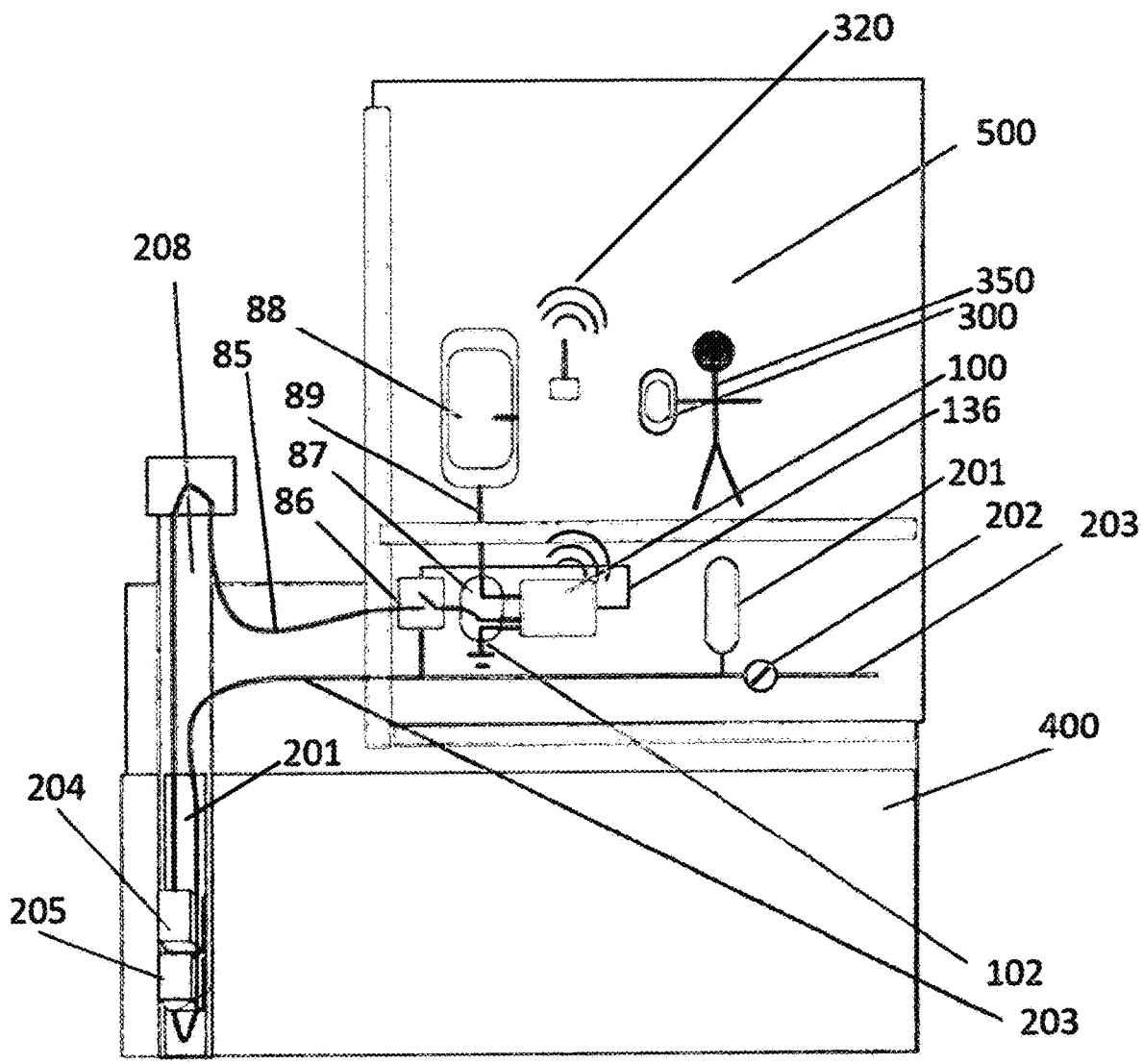
FIG. 1 is a representation of a typical ground water well and the connection of an apparatus for performing the methods of determining height discussed hereafter.
Figure 8:
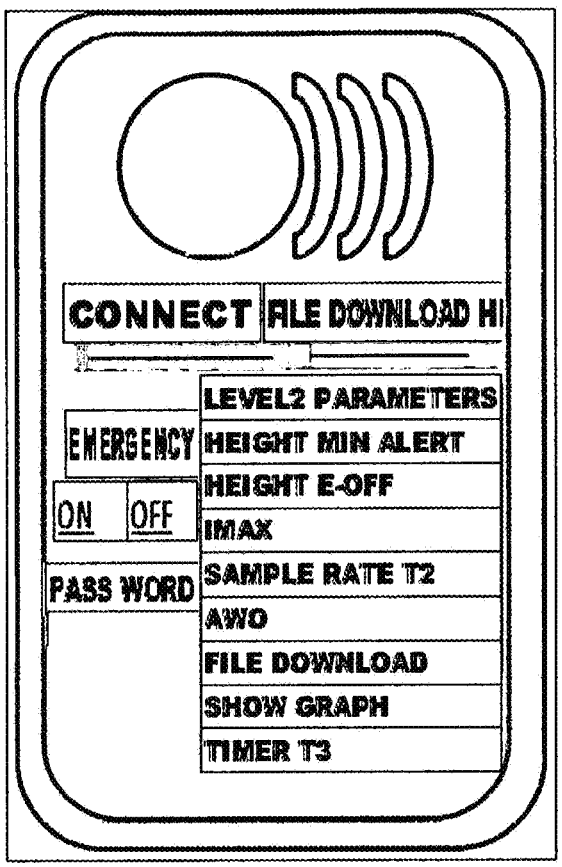
FIG. 8 shows an example of using a smartphone to provide a remote control apparatus operating panel.
Figure 10:
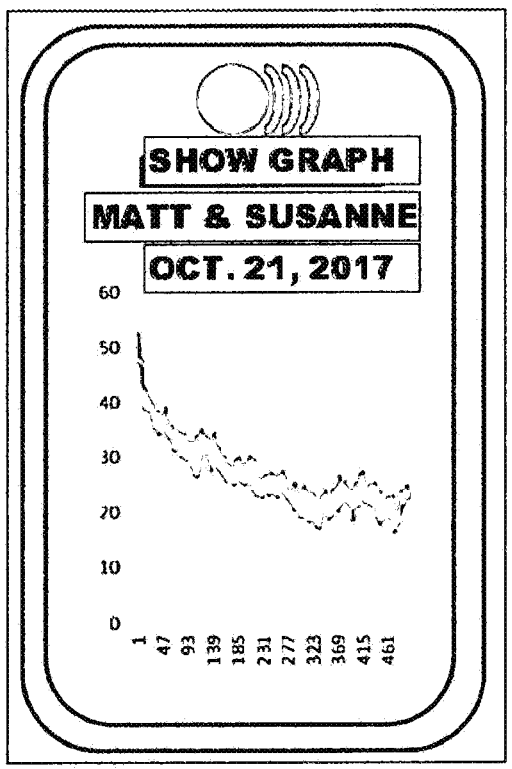
FIG. 10 shows a smartphone used as the remote control apparatus with an example of a display, which graphs the water table plotted over the number of measurement points.

FIG. 1 is a schematic overview showing a typical household well system, exemplary for most well systems and for discussing the present method and apparatus. The well 208 has a submersible motor 204 and a submersible pump 205 in it. The submersible motor is connected via a power wire 85 which can be single phase, split phase or three phase. In FIG. 1, the connection is represented by a single wire 85. The pump 85 is connected to a pipe 203 which pumps the water to a pressure tank 201 and then is also typically connected to a valve 202 to be able to shut off the water supply to the house 500 or other users or locations. Connected to the pipe 203 is a pressure relay 86 which typically has a turn-on at a lower pressure than the turn-off at high pressure. The motor 204 is normally connected directly to the pressure relay 86 and the pressure sensor 136 directly connected to the fuse panel 88. To install the present apparatus 100, the connection of one phase wire of either a single phase, split phase or three phase is routed through the apparatus 100. In addition, the neutral wire 102 of apparatus is connected in the junction box 87. The apparatus 100 communicates via blue tooth transmitter 103 with the smart phone 300 of the operator 350 or via the Wi-Fi transmitter 114. The smart phone 300 can run an application (discussed below with regard to FIG. 8) that has a control screen to download parameters to the apparatus 100, to download control signals such as emergency off to the apparatus 100 or (as shown in FIG. 10) to load files or graphs showing the water level 400 of the well 208 either over time or over several measurement intervals. In the example shown in FIG. 1, the apparatus 100 is provided with an additional input from the pressure sensor 136 as a 4-20 mV or a 0-5V reading.

Figure 2:
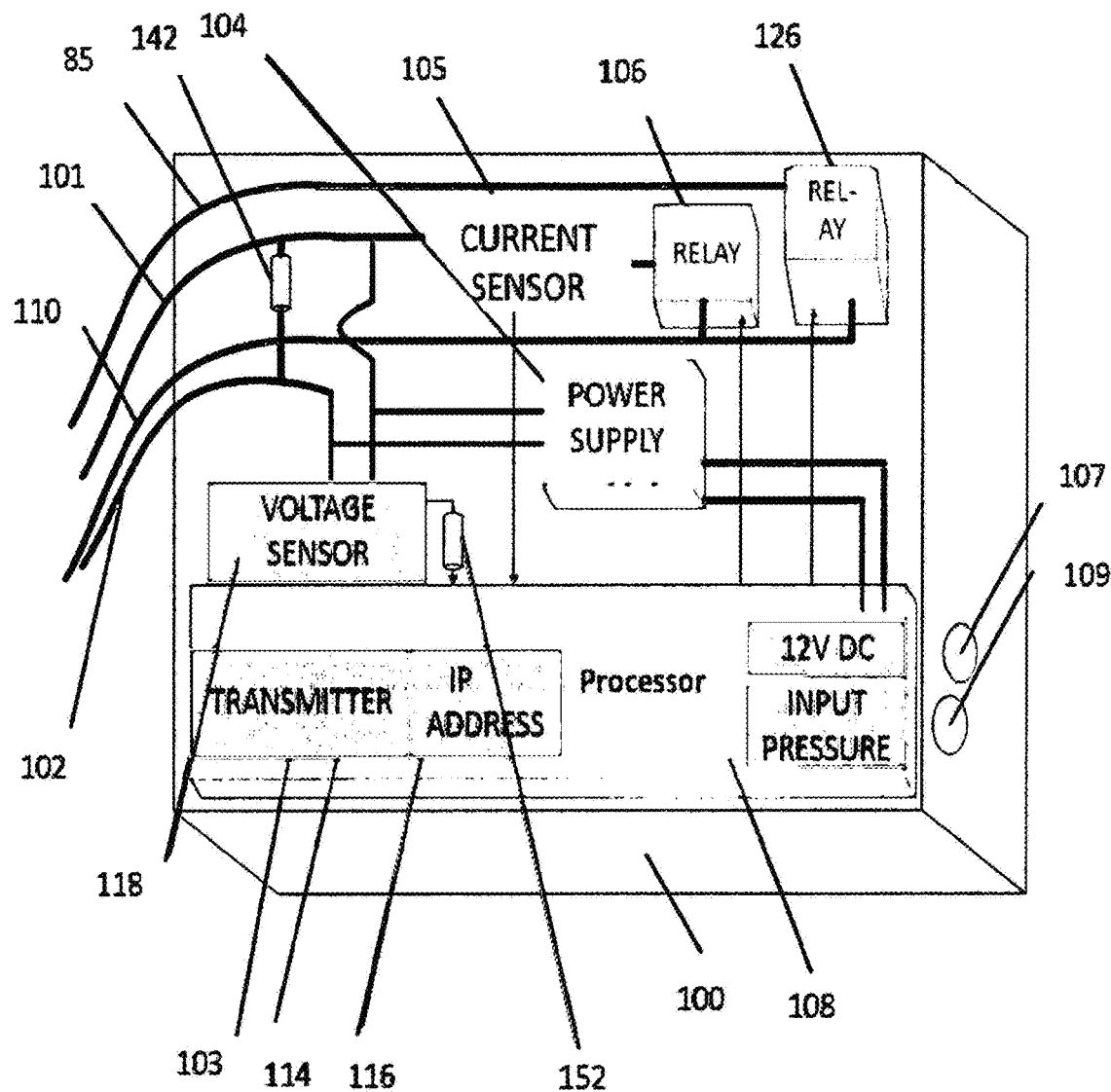
FIG. 2 is block diagram of a preferred embodiment of the apparatus shown in FIG. 1.
Figure 9:
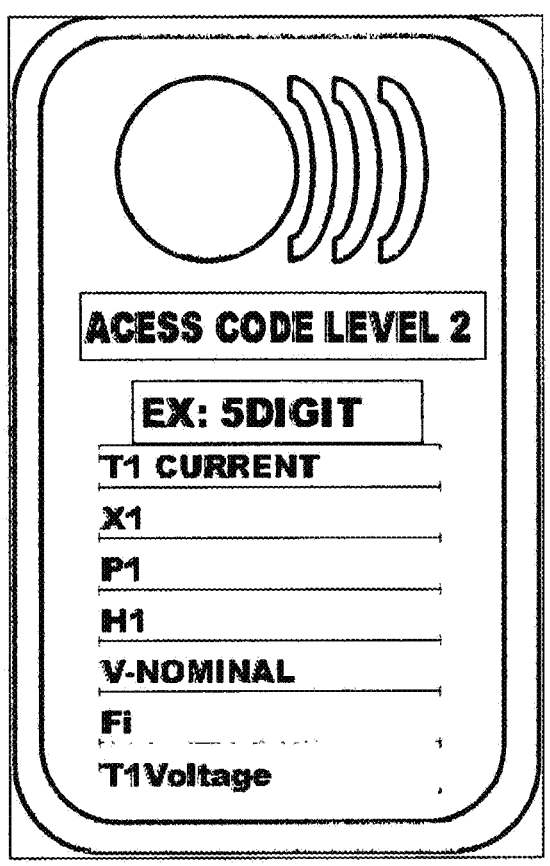
FIG. 9 shows a smartphone being used to provide the remote control apparatus operating panel, when providing for professional Level 2 access parameters. Access to level 2 parameters would be granted to professional operators

FIG. 2 details the internal connection of the main function blocks of the apparatus 100. The wire 89 of one phase coming from the panel 88 is connected to one wire either 101 of the apparatus. Then consequently wire 110 is connected to the wire 85 via the pressure sensor relay 86. The wire 102 is connected in the junction box 87. The Voltage sensor module is connected between the phase wire 101 and the neutral-wire 102. To protect the pump motor from high voltages of lighting strike on the grid a voltage transsorber 142 is mounted between ground and a phase wire 101. The current sensor 105 is connected to the wire 101 and to the Relay 106. The current sensor output to the processor 108 is connected to a filter 152 to smooth the signal from the current sensor 105. The relay 106 allows for the processor 108 in accordance with the process described in Flow Chart FIG. 4A-4D, FIG. 5 to operate the relay and thus create an automatic well management apparatus. The transmitter 114 then can communicate with the operator via blue tooth transmitter 114 with the smart phone application shown in FIG. 8 and FIG. 9. It should be appreciated that alternative user interface schemes known to those in the art could be employed, including using an optional internet-based command application (which could communicate with the apparatus via its own IP address 116 through WI-FI network using the transmitter 114), and/or a dedicate control/display interface provided with the apparatus. The device can be connected to a 12V socket 107 to power the apparatus 100 or it can use an internal 240/120V to 12V power supply 104. For the purpose of running a constant pressure mode pump, the preferred embodiment also has an input for the pressure sensor 109 as a 4-20 mA or 0-5V input coming from the output of the pressure sensor 86.

As shown in the flowchart of FIG. 3-7, the embodiments shown in FIGS. 2, FIG. 8-10 overcome the drawback of conventional water level sensors that are installed inside a well. The water table measurement relies on the main phenomena that the water or liquid table is proportional to a specific range of the maximum current of the pump motor, however the range is obscured by the fluctuations in voltage and by the inaccuracy of the current sensors.

Figure 3A:
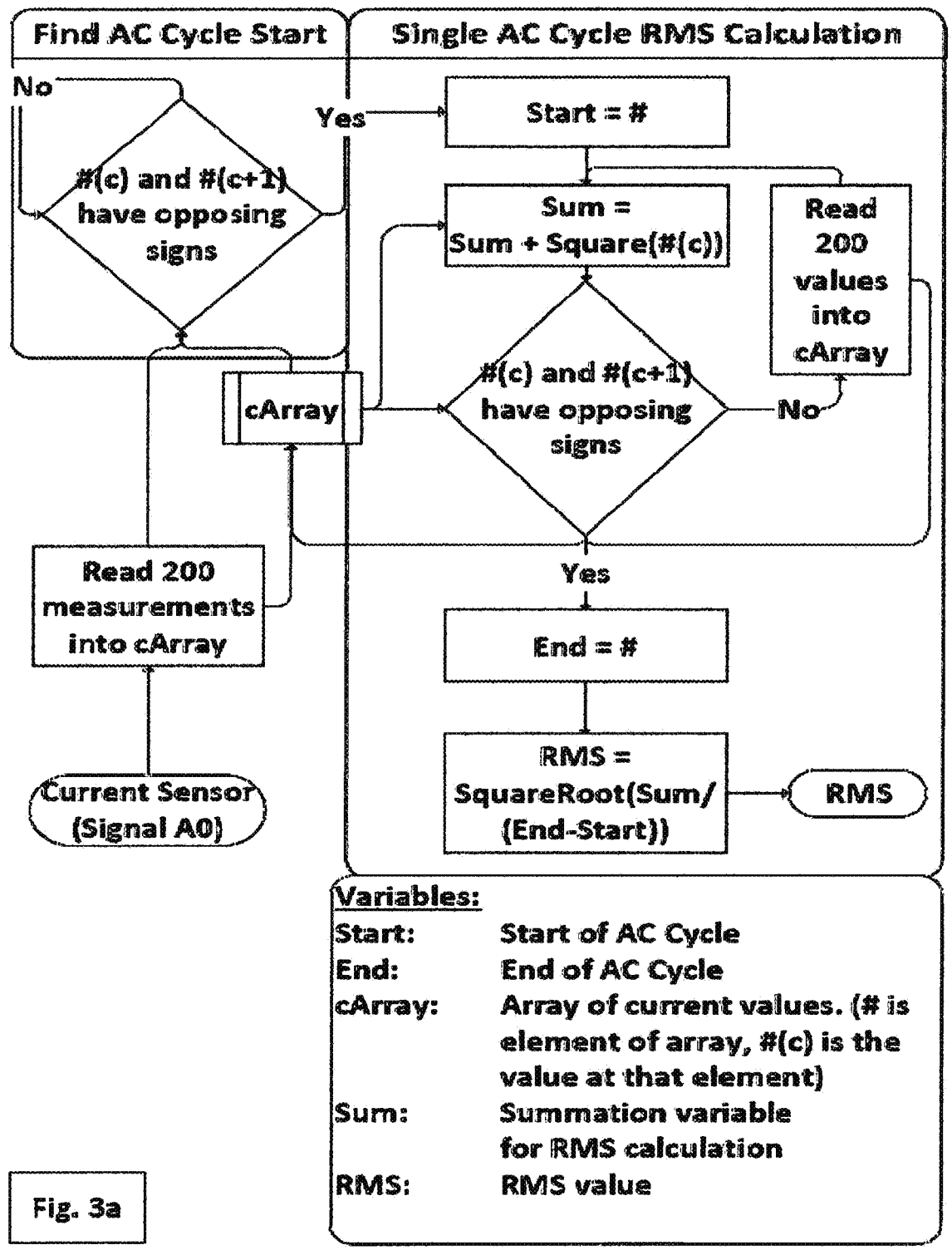
FIGS. 3A and 3B illustrate a flow chart showing the transformation a signal received from a current sensor of the apparatus to provide a digital number representing a true rms value of the current over an adjustable time span and adjustable number of measurements in the time span.
Figure 3B:
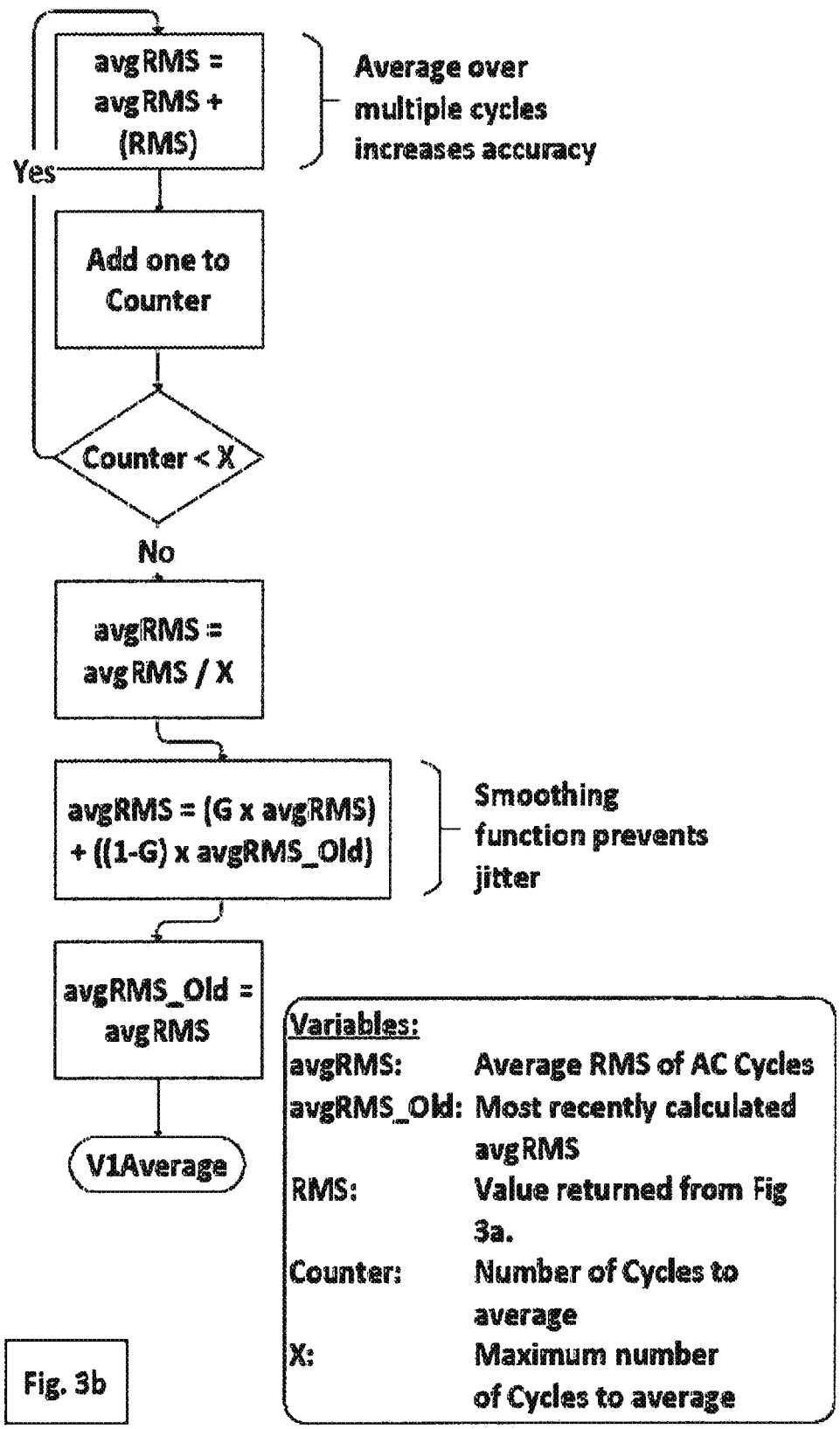

The flowchart of FIGS 3A & 3B shows the extraction of the current sensor information. By taking multiple measurements of the current signal and averaging these measurements together with the hardware filter 146, a very accurate digitized current value is established. The flow charts 4A-4D illustrate the steps of obtaining the water or liquid table value H from the current value provided in FIGS. 3A & 3B.

The digitized values of the current and voltage are converted into calibrated current and calibrated voltage readings and then used to create the water or liquid table level reading.

Figure 5:
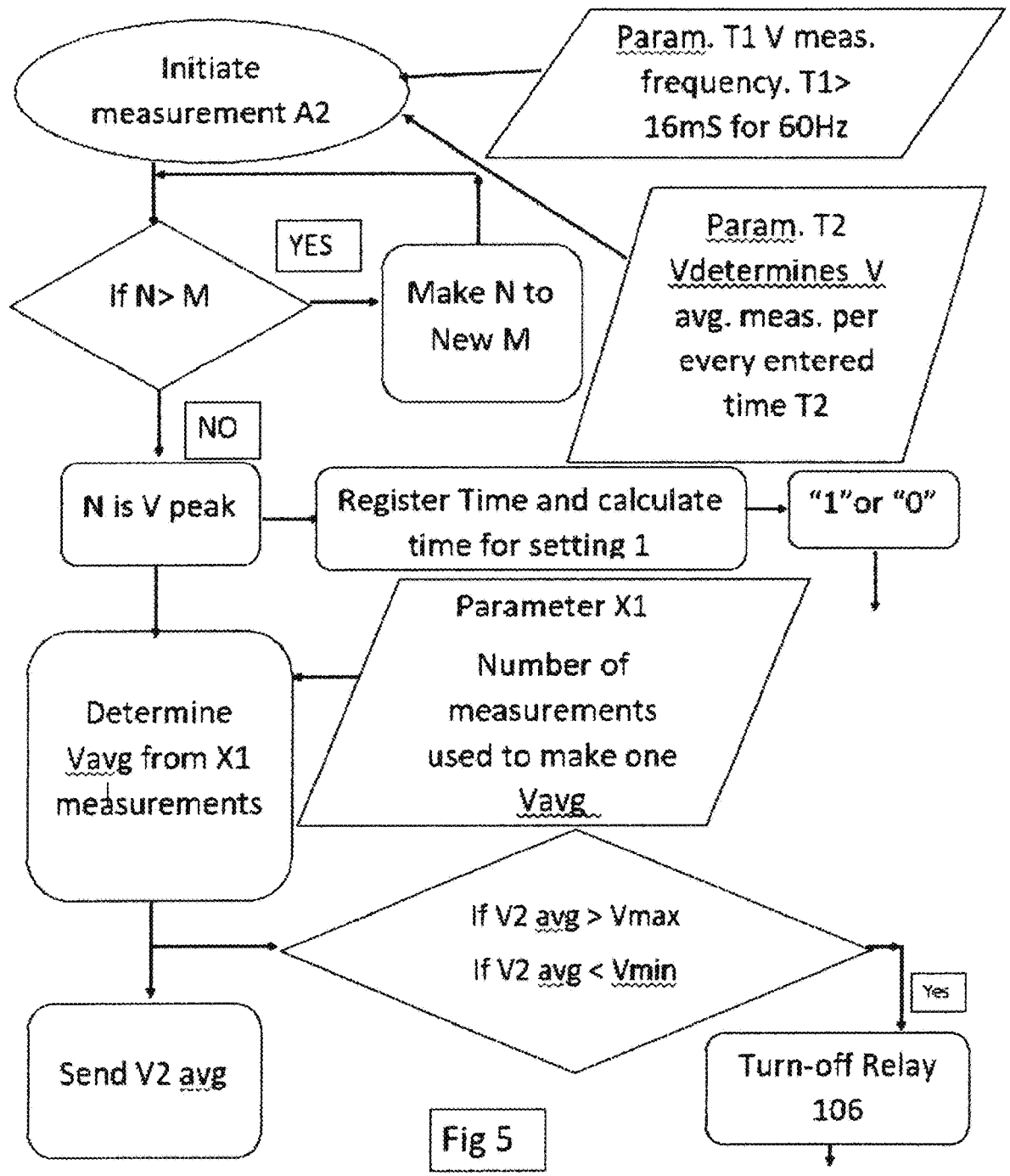
FIG. 5 is a flow chart showing the transformation of a voltage signal from the voltage sensor of the present invention to a digital number representing the average peak voltage measured over an adjustable time span and adjustable number of measurements in the time span. This FIG. 5 also shows the emergency shut down in a under voltage condition.
Figure 6:
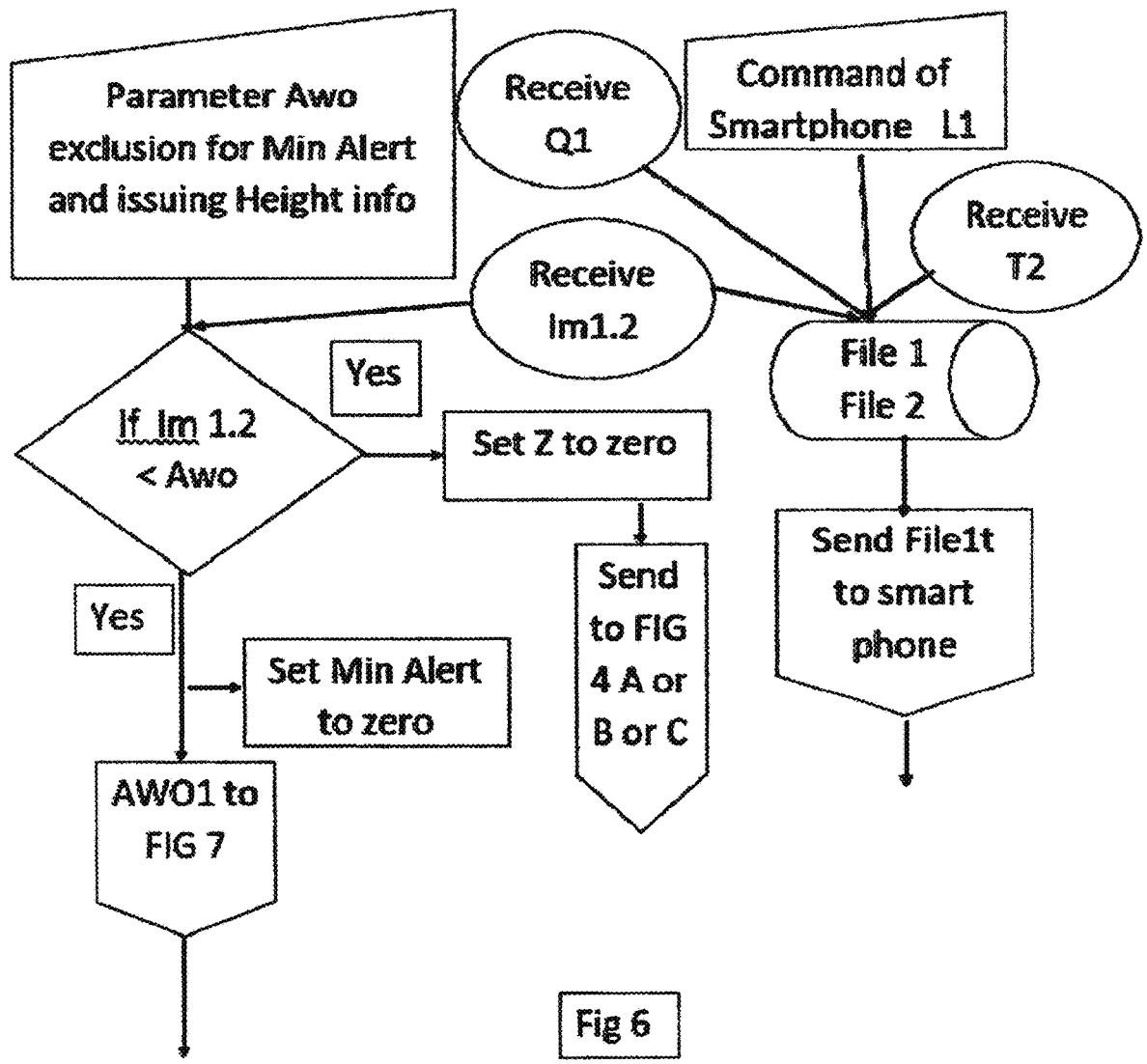
FIG. 6 is a flow chart showing the operation of the exclusion input Z to avoid issuing height information for non-relevant values of the current measurement. In addition it shows the outline of shutting down the pump motor in the event that the well level is so low that a pump motor cannot build up the pressure to turn off the pressure relay. In this event the AWO1 shut down signal will be sent to the shutdown switch.
Figure 7:
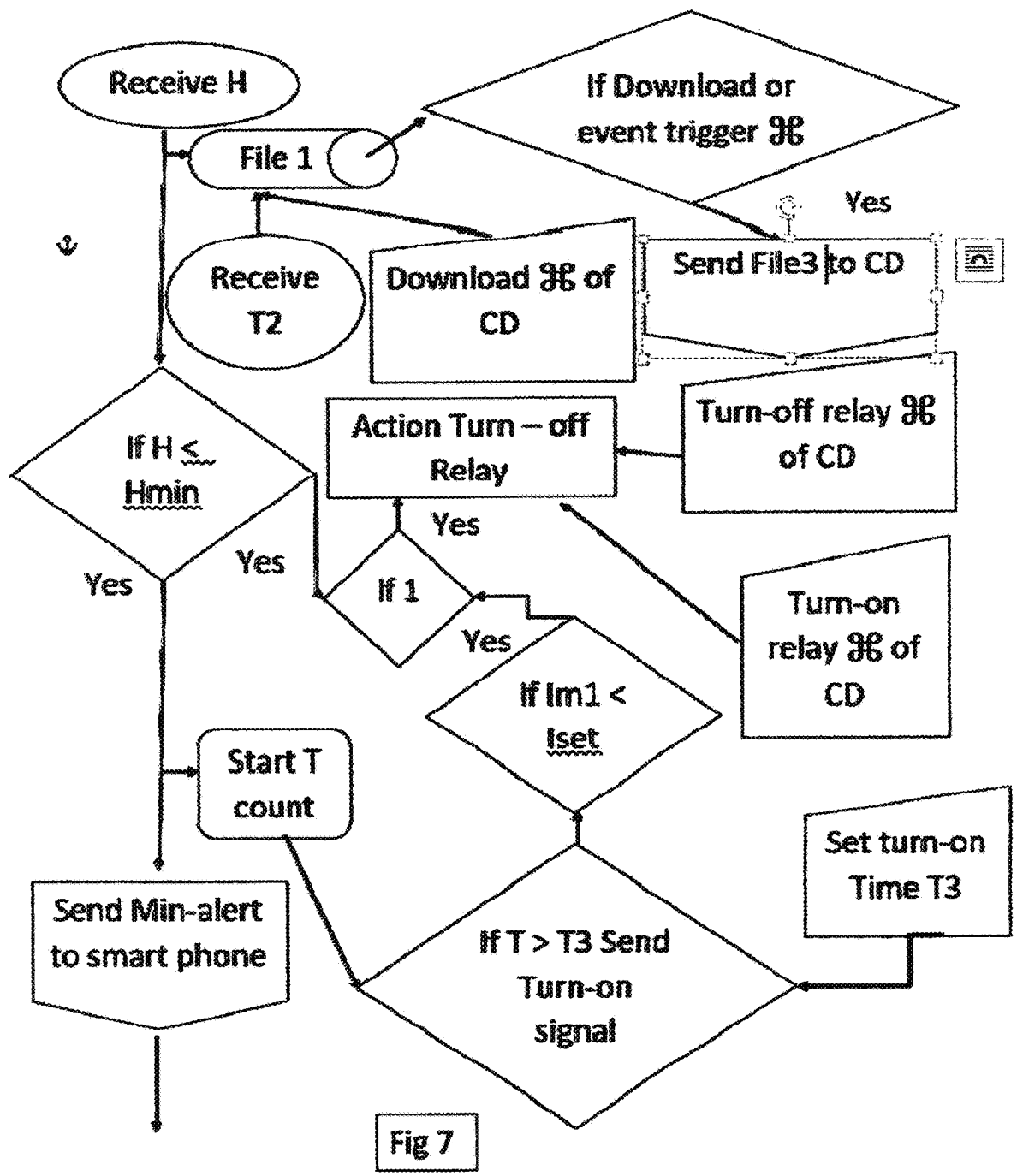
FIG. 7 is a flow chart showing the operation of the well management in the minimum water level alert routine. In the event of the water table reaching a point below the minimum desired level the pump motor is turned off and also the process of turning on the pump motor to ensure that the pump motor only is operating if the well has enough water to build up the pressure in the pressure tank to turn-off the water. This figure further shows the method to collect and store the water level data.

FIG. 4 A-D illustrate 4 methods of extracting the water or liquid table H using the measured current, which are discussed in greater detail below. In the event of an inverter-operated pump motor, the additional information of the measured pressure Psi1 may be necessary, as the inverter no longer only operates with one frequency. To achieve an accurate water or liquid table value, the program codes in the method shown in FIG. 4C use the technique of adjusting the current value in respect to the fluctuating grid voltage, and also to isolating the portion of the current that relates directly to the water level in the well. FIG. 5 shows a method for obtaining the digitized voltage value. In addition, the FIG. 5 flow chart also shows the method of using this digitized voltage value to create an emergency shut down via the relay 106 in an under-voltage condition, which is dangerous to the pump motor. In addition, the flow charts FIG. 4 A-D show at which process steps of the program the adjustable settings are effective to make this apparatus and method highly accurate for water table level determination across a wide range of well sizes, shapes and configurations. FIG. 4 A-D show the method used to detect over-current situations and to use relay 106 to disconnect the pump and pump motor from such failure events. FIG. 7 shows the method of determining when the minimum well water or liquid level is reached and turning-off the pump in the event the minimum well level is reached. When the minimum water or liquid table trip level is reached the time delay of turning-on the pump motor is activated. After the time delay is completed the pump motor is turned on. If the current level stays below a certain adjustable value AWO as in FIG. 6 the pump motor is turned-off with the relay 106 by setting the value of H to zero with Z=0 as the water table is insufficient to have the pump build the pressure to activate the pressure relay 86. After an adjustable time, the relay 106 is turned-on. Once the current level exceeds the setting of the adjustable current value AWO the pump motor will stay on until the pump motor is turned-off by the maximum setting of the pressure relay 86. FIG. 7 also shows the method of creating files and sending these files to the remote control device 88. The download of such file to the remote control device 88 can be triggered by an event or a download command.

As discussed above with regard to FIGS. 1 & 2, the apparatus 100 has a current sensor connected in phase of one phase wire and a voltage sensor connected between a phase wire and the ground of the pump motor. An analogue to digital converter is a used to convert the voltage signal level of the sensors to digital format allowing a microprocessor to perform signal analysis. The apparatus further includes a programmable read only memory for storing an operating program and application program for the microprocessor. The apparatus has two relays. One relay is connected in line with the existing pressure sensor relay and the other is connected in parallel with the pressure switch. The relay 106 is a normally closed relay and the relay 126 is a normally open relay. In addition, the apparatus has a processor 108 that communicates with the voltage sensor 118 and the current sensor 105. The present invention creates its own internal 12v supply from the existing connections to the sensors 105 and 118.

The motor current of the pump motor is dependent on the load. When the water or liquid table is highest, the load on the motor is highest Imax; when the water table is below the intake of the pump, the current reaches its idle current value. When the water table is just above the water intake of the pump 205, then we have the minimal operation current Imin. Using the method shown in FIG. 4A, Imax and Imin are due to the inherent change of the pump and motor efficiency and the water table depth. With the method shown in FIGS. 4B and 4C, the water table height H can be determined using current between Imax and Iminn. This proportional current is 3 to 4 times smaller than the current between idle operation and the minimal operation current, and it is also obscured by the grid fluctuations and possible current measurement jitters. Imax represent the maximum water table and Imin represents the minimum water table. The difference between I max and Imin typically are only a couple 100 mA. A significant challenge of the present method is to extract a stable current reading of several mA when measuring an overall current of 5 to 20 Amp. In addition, the fluctuating grid voltage would make this current measurement accuracy of several mA completely impossible.

This is possibly the reason why the variation of current responsive to fluid height was never discovered. Furthermore, having the information on the current and the voltage of the pump motor allows the apparatus to understand when to initiate various operational commands to the relay 106. In the event of a constant pressure well (discussed below with regard to FIG. 4D), the current is measured on the input side of the inverter supplying the pump motor. In a constant pressure system, the pressure is always measured. Using the affinity laws, the flow Q1 can always be calculated using the pressure Psi1. Using the flow Q1, the water table H can be calculated. In this case, the power is used to change the equation of the H=f(Q1,Pm1.1) to adapt the water table curve to the different power levels.

Operation

FIGS. 3,4,5,6 and 7 provide flow charts showing the overall operation of examples of the present method. The input Ao in FIG. 3A is provided by the current sensor 105. The initial process described is to determine a true rms current. The current measurement is subject to a hardware filter before digitization and also to a program code to smooth the result after digitization, resulting in the rms current value (shown in FIG. 3B), which is sent to the control 2 FIG. 4A-4D as V1 average. The reason for repeating the determination (as shown in FIG. 3B) is to decrease the jitter of the current reading as for household well system the relevant current reading is only several 100 mA. Thus the current reading precision needs to be in the range of 5 to 10 mA to achieve a market acceptable water table 400 reading.

FIGS. 4A-4D illustrate 4 different schemes for determining fluid height, hereafter referred to respectively as methods 4A-4D for convenience. Methods 4A, 4B, and 4C are methods used for the fixed speed motors. These methods allow for a user Library to generate the parameters need to set the water table measuring apparatus or to set individual parameters needed directly. The user Library would have all the known pumps and pump motor specification data, thus the user would only need to enter the pump and motor make that is installed. These methods use the measurement of the current of the pump motor to determine the liquid table levels. The different methods each have a certain advantage in applications. The Method 4D is applied when the pump motor is operated with variable speed. In this case the flow Q1 is determined with the pressure and the current measurement is used for adjusting the power level of the H=f(Q1) curve. All these methods can use to the measurement of the current and voltage of the pump motor to determine the liquid table levels. The different methods each have a certain advantage in applications. If a pressure sensor or a flow sensor is available then these measurements can be used to reduce the amount of calculations to create the flow and pressure out of the current measurement. These methods allow for a user Library to generate the parameters needed to set the water table measuring apparatus or to set individual parameters needed directly. The user Library would have all the known pumps and pump motor specification data, thus the user would only need to enter the pump and motor make that is installed.

Method 4.A.

The water table value H of the scheme shown in FIG. 4.A is determined using the EQ 4.A.1, below; this scheme is appropriate when accurate information on the pump and motor efficiencies are available. The method used relies on the fact that for every set of water table height H, efficiency of the pump, and flow, a defined pump power is needed. With the knowledge of the pump motor efficiency, the pump power can be transformed to obtain the pump motor power and solved for the variable water table height H shown in EQ4.A.1 Using Q1=f(Pm1) like the affinity laws as an example, the flow Q1 needed in EQ4.A.1 can be derived from the measured pump power Pm1 as shown in EQ 4.A.2. Also for accuracy, the efficiency of the pump/motor needs to be correctly described in its dependency on the power Pm1 as shown in EQ 4.A.6. FIG. 4.A shows that the parameters needed can be obtained from a pump/motor library or can individually be loaded into the system.

$$H = \frac{\eta_m * Pm_{1.2}}{F_f Q_1} - \frac{Fsi * Ps_1 * 2.31^*}{1} (m) \quad \text{(EQ) 4.A.1}$$

(LUT) found in look up table or generated out of the selected pump and pump motor manufacturer specification.
2.31 is a normalizing number (H1) for converting as an example feet to meters.
ηm is efficiency of pump/motor (LUT)
$Psi_1$ is the max pressure from the water column and the pressure tank Psi2
Pm1.2 is the measured power (W)
Q1 is the flow derived out of the measured power $$\left(\frac{kg}{s}\right)$$

$F_f$ is normalizing factor ·ρ·g $$\left(\frac{kg}{m^3} * \frac{m}{s^2}\right)$$

$F_{si}$ is-=normalizing factor ·1/ρ·g
Using approximation laws such as the Affinity laws as an example, the flow 4.A.2 and the pressure 4.A.3 can be calculated with the measured power. Before this can happen, the user would have to enter the pressure and/or the flow at a given power P2.

$$Q_1 = f(Pm1) \text{ example } Q_1 = \frac{Q_2^3 \sqrt{Pm1}}{\sqrt[3]{P2}} \quad \text{(EQ) 4.A.2}$$

$$Pm1.2 = (Im1.2 * Um1)(W) \quad \text{(EQ) 4.A.4}$$

$Im_{1.2}$ is the measured current
$Um_1$ is the measured voltage
Mval is a dynamic correction factor if only the current is needed.

$$Mval = U_{nominal}/U_{m1} \quad \text{(EQ) 4.A.5}$$

P2 is the power at the pump relay turn-on setting and full well
Psi2 is the pressure at the pump relay turn-on setting
Q2 is the flow at the pump relay turn-on setting and full well For the water table depth H equation 4.A.1 the efficiency of the pump in dependence of the flow Q1 also needs to be calculated. The empirical curves as an example of the pump/motor are usually combined can be described by the equation 4.A.6.

For the water table depth H equation 4.A.1, it is also necessary for higher accuracy to calculate the efficiency of the pump motor in dependence of the current Im1. The empirical curves of the pumps can be described as an example by the equation 4.A.7. In this case the current needs to be corrected by the factor Mval as the fluctuation of the grid will lead to a fluctuation of the current independent of the load.

$$\eta_m = \frac{Pm1}{F_\eta} + (\eta m min) \quad \text{(EQ) 4.A.6}$$

Fη is a factor from the motor efficiency curve (LUT)
ηmmin is minimum efficiency of motor (LUT)

Method 4B

Figure 11:
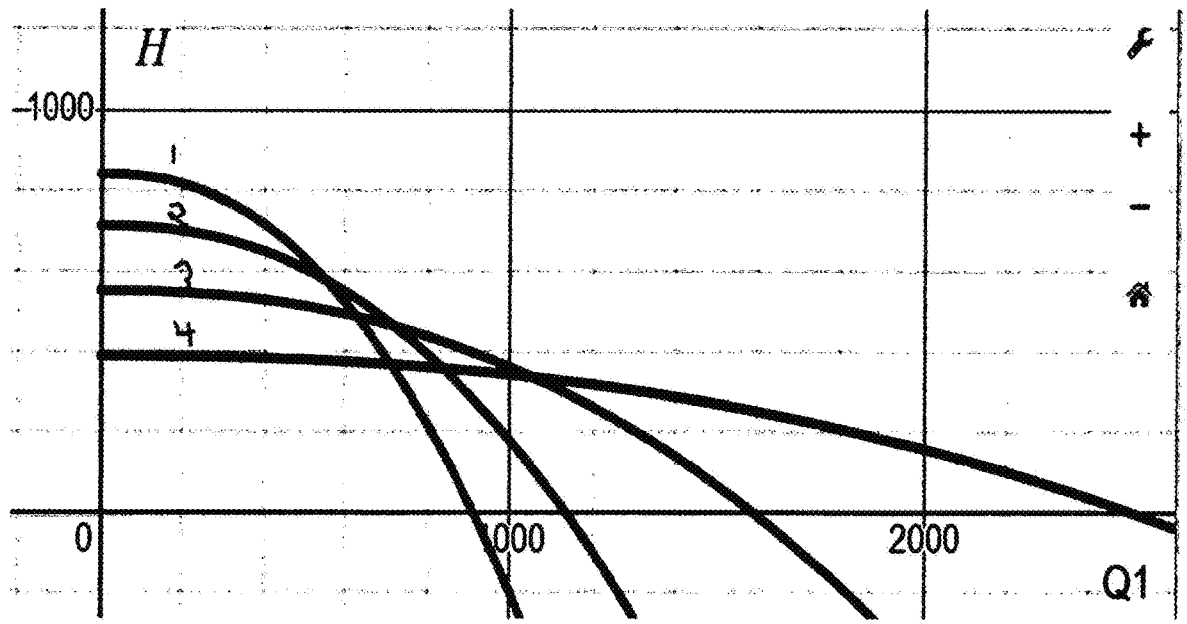
FIG. 11 shows, as an example, the pump curve for 1.5 HP motor for different nominal flow levels. In this example x=Q1 and k is set at 2.3, which replicates the curves of the manufacturers closely. The Fi*Ps1*2.31 part of the equation is not shown. Y-axis is in feet and the X-axis is in [GPM*100].

This method takes advantage of the intrinsic influence of key parameters on the shape of the water table versus flow curves shown in FIG. 11. The advantage of using the 4.B approach is that the input parameters (Pmax Imin, Hmax, M1, GPM) are typically known or more readily accessible to the operator than the input parameters of the Method 4.A. The water table value H of the Method 4.B is determined using the EQ 4.B.1, below. The method applied here takes advantage of the typical water table versus flow curves FIG. 11. FIG. 11 also shows the adaption to each pumps system within a class of pump systems. This adaption can be achieved knowing the number of impellers installed (or actual well depth) versus the number of impellers that would be maximal possible (or actual maximum well depth) for such class pf pump motor systems. Using a modification of the affinity laws, the flow Q1 needed in EQ4.B.1 or EQ 4.B.2 can be derived from the measured pump power Pm1 as shown in EQ 4.B.3. The Psi2_reduces the water table in EQ 4.B.1 in proportion to the pressure in the system and is equivalent to about 30 meters in residential wells. The actual current used is the current in the range between Imax and 1 min. This is why as in EQ4.B.6 the Imin is deducted from the measured current to establish Im1. FIG. 4 B shows that the parameters needed can be obtained from a pump/motor library or can individually be loaded into the system. M1 and Hmin are same over most manufactures and can be preset. As per FIG. 4B allows access to the user library incorporating all the known pumps and pump motor specification data, by entering the installed pump and motor make.

$$H = \qquad \text{(EQ) 4.B.1}$$

$$\frac{Hn}{1} - \frac{Q1^k * H\max}{M1 * H\min * \left(\frac{H\max}{Hn}\right)^3 * \left(\frac{Hn}{H\max}\right)^4} - Fsi * Psi2 * 2.31(m)$$

$$H = \frac{H\max}{1} * \frac{Ipn}{Ipm} - \qquad \text{(EQ) 4.B.2}$$

$$\frac{Q1^k * H\max}{M1 * H\min * \left(\frac{Ipm}{Ipn}\right)^3 * \left(\frac{Ipm}{Ipn}\right)^4} - Fsi * Psi2 * 2.31(m)$$

Figure 12:
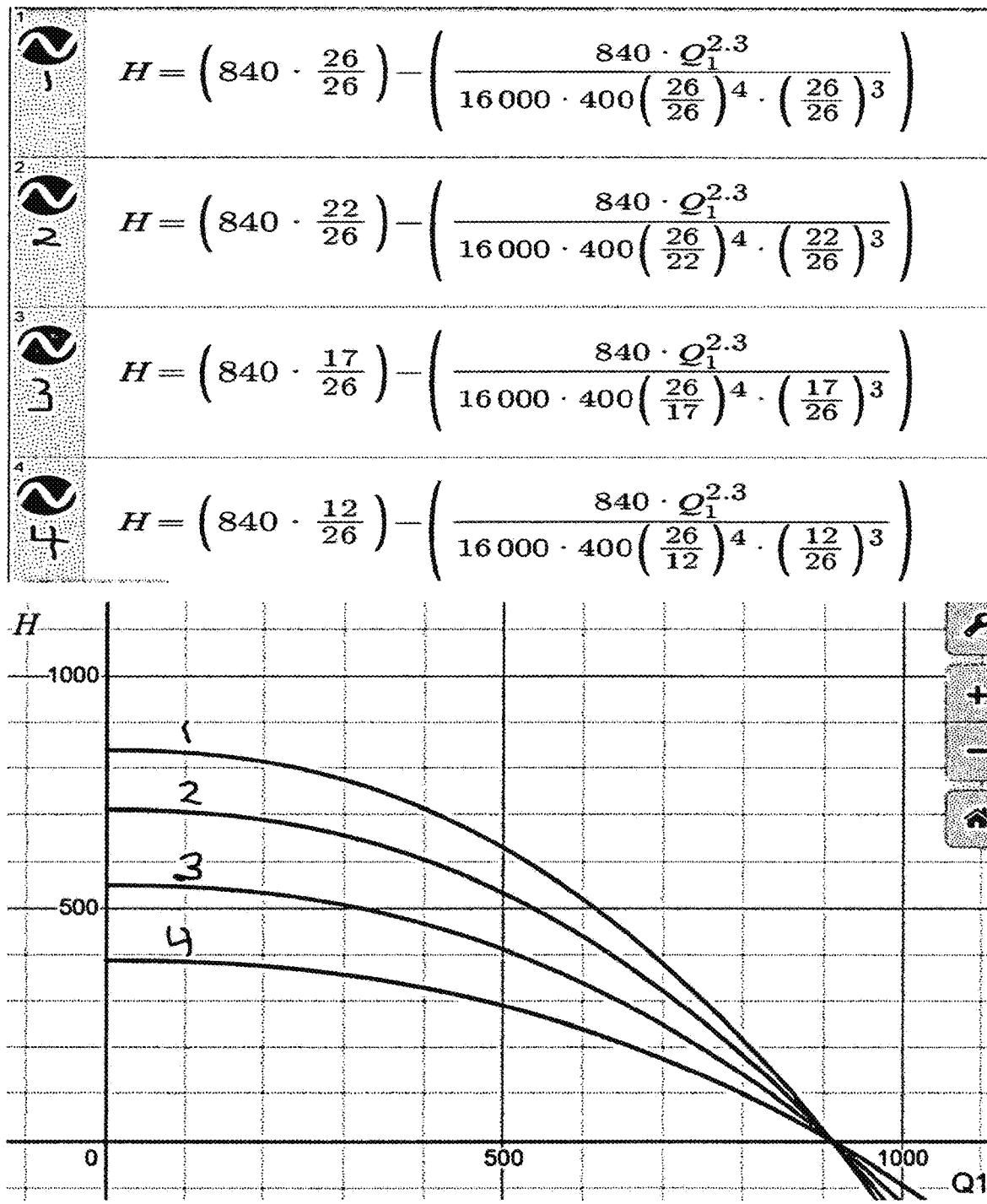
FIG. 12 shows as an example of the pump curve for 0.5 HP to 1.5 HP motor for same nominal flow Q levels, the different power levels are translated into the equation terms that uses the power of three. The Fi*Psi2*2.31 part of the equation is not shown. Y-axis is in feet and the X-axis is in [GPM*100].

FIG. 11 shows as an example the pump curve for 1.5 HP motor for different nominal flow levels using the above equations. The term $$\left(\frac{Hn}{H\max}\right)^4$$

is used to change the nominal flow and the term $$\left(\frac{Hn}{H\max}\right)^3$$

is used to change the nominal power level as shown in FIG. 12. FIG. 12 shows as an example of the pump curve for 0.5 HP to 1.5 HP motor for same nominal flow Q levels, the different power levels are translated into the equation terms that uses the power of three.

$$Q1 = \frac{Q2 \sqrt[3]{\eta_m Pm1}}{\sqrt[3]{P2}} \qquad \text{(EQ) 4.B.3}$$

$$Pm1 = Im1 * Um1 \qquad \text{(EQ) 4.B.5}$$

$Im_{1.2}$ is the current=$V_2$*Fi $Im_1$ is the current=$Im_{1.2}-Imin$ \qquad (EQ)4.B.6

Imin motor parameter Idle Load Amp (LUT) (Well has no water)

$Um_1$ is the measured voltage

Hn is the depth of the well being measured

Hmax is the depth of the well for a class of pump/motor systems

Ipn is the numbers of impellers installed

Ipm is the max numbers of impellers for a class of pump/motor systems $M_1$ is a preset normalizing factor, but is accessible for future adaptation purposes P2 is the power at the pump relay turn-on setting and full well Psi2 is the pressure at the pump relay turn-on setting Q2 is the flow at the pump relay turn-on setting and full well Method 4C The simplified version Imax employed in Method 4C uses the inherent property of the pump/motor system curves that allows a mathematical modelling directly dependent on inputs Imax, Hmax, and Psi2, which are typically known or readily obtainable by the users of the well, even if detailed information on the pump and motor operation is not available; thus, method 4C is particularly valuable for use on older well systems where information no longer is available. Method 4C transforms the grid voltage corrected current measurement into a water table value H as shown in the EQ4.C.1. This method can be used because the motor when pumping water out of the well always operates between FL amps=Imin (current when well is empty) and SF amps (current when well is full) (Max operational current=Imax). SF amps-FL amps constitutes the operation range from Full well to empty well. When the well is full, the current draws the SF amps, and when the well is empty the motor draws the FL current at open throttle. The actual current used is the current in the range between the Imin and Imax. This is why as in EQ4.C.3 the Imin is deducted from the measured current to establish Im1. Im1 as per EQ4.C.3 is corrected with Mval to make the pump current independent of the fluctuating grid voltage. With the factor Fh the EQ 4.C.1 results are straight lines as shown in FIG. 13 Graph using the formulas in 13 Formula in comparison to the curves using the method shown in FIG. 4.B. The straight lines are 100% accurate at zero water table and full water table. These straight lines can be mathematically manipulated using a variable hyperbola term to follow the curves form of the method described in FIG. 4B and thus increase the accuracy throughout the water table at all levels. In this method, as in the Method described in FIG. 4B, the Psi2 needs to be entered into the GUI.

The Method 4C operation does not need a library of pump/motor data, and the setting of the device can be fully automated. Imax can be determined when measuring the well in operation. Imax would determine P2=Imaxsf*Un. The nominal voltage Un is preset. Psi2 is then the turn on Psi of the pump relay. In the event of a Psi sensor being available, the input of the Psi sensor can directly be connected and the setting for the Psi is not required anymore.

$$H = \left((Im1.3 * Fh) * \frac{Hn}{H\max}\right) - Fsi * Psi2 * 2.31(m) \qquad \text{(EQ) 4.C.1}$$

$Im1.2$ is the current=$V_2$*Fi $Im_{1.3}$ is the current=$(Imax*1.08-Im1.2*Mval)$ \qquad (EQ) 4.C.3

Imin motor parameter Idle Load Amp (LUT) (Well has no water)

Imax motor parameter Service Factor (SF) Amp (LUT)

$Um_1$ is the measured voltage

Hn is the depth of the well being measured

Hmax is the depth of the well

Fh is a normalizing factor number in a look-up table that corresponds to a Imax

Mval is a dynamic correction factor $$\text{Mval} = U_{nominal}/U_{m1} \qquad \text{(EQ) 4.C.4}$$

P2 is the power at the pump relay turn-on setting=Imax*Un \qquad (EQ) 4.C.5

Psi2 is the pressure at the pump relay turn-on setting

FIG. 13 shows a comparison of the pump curve for 0.75 HP to 1.5 HP motor for same nominal flow levels using method 4.B and 4.C. The straight curves are the curves of the 4.C method. In the last three equations x=I measured and Imax=840 mA as X-axis is in mA and Y-axis would be in feet. Fh=1 in this example.

Method 4D

The Method 4D is an example of a scheme suitable for use with variable speed pumps, and uses the inherent property of the pump/motor system curves that allows a mathematical modelling directly dependent on inputs Imax, Hmax, Psi2, these parameters typically being known or easily obtainable by the users of the well. This method measures the current and voltage and thus Pm1.1 on the input of the inverter. The main challenge is changing the H/Q1 curve in dependence of the power drawn from the input side and is solved as per EQ4.D.1, below. The variable speed application (also known as constant pressure) will always have a pressure sensor with an output Psi1. With the direct measurement of the pressure, the affinity law can be used to calculate (as in 4.D.2) the flow Q1 calibrating at a given pressure the EQ4.D.2 with the flow value Q2. Of course, in the event that a flowmeter is available, the signal Could be used to directly access the signal to Q1 to use in the equation 4.D.1. The system needs to be calibrated by entering the Q2 value at the Psi2 value. In the event that a flow meter is connected that directly measures Q1, no calibration of Q2 would be necessary. FIG. 14 shows as an example the adaptable pump curve for 1.5 HP motor for different power levels during the drawdown of a well at constant pressure and flow. In this example k is set at 2.3, which replicates the curves of the manufactures closely.

$$H = \frac{Pm1.1 * H\max}{P\max} - \frac{Q1^k * P\max}{M1 * Pm1.1} - Psi2^*2, 31(m) \quad \text{(EQ) 4.D.1Q}$$

$$Q1 = \frac{Q2\sqrt[2]{Psi1}}{\sqrt[2]{Psi2}}(m^3/s) \quad \text{(EQ) 4.D.2}$$

$$Pm1.2 = Im\ 1.2 * Um1 * Mval(VA) \quad \text{(EQ) 4.D.3}$$

$Im_{1.2}$ is the measured current
$Um_1$ is the measured voltage
$M_1$ is a preset value, but is accessible for future adaptation purposes Pmax is maximum rated motor power=Imax*Un  (EQ) 4.D.4

(Might include a brief introduction to the following section, and a broad statement of how it fits with the methods discussed above.)

The input A2 in FIG. 5 is provided by the voltage sensor 118. The initial process described is to determine the voltage. The parameter X1 determines how many peaks are determined.

Then the average peak is sent to the flow chart shown in FIG. 4A-4D, as appropriate for the particular situation. FIGS. 4A-4D show that the control receives both the V1 data from the current sensor 105 and the V2 data from the voltage sensor 118. The V1 is converted to a final current value with the Fi multiplier parameter used for calibrating the current sensor value V1. This current value Im1 is used in a more sophisticated calculation to then determine the actual water table 400 height H. An additional parameter called H1 is used to adjust the measurement unit such as to feet or meters. The Parameter I max is based on the name plate nominal current of the motor. Imax can also be measured and extracted and downloaded into file as shown in FIG. 6 in the event there is no name plate available. The file shows all the current readings and also highlights the min and max current during a well operation that is started when the pump motor 204 turns on and is shut down by the Pressure sensor relay 86. In the event that the Hmin or the Imax alerts are activated and indicate that there is an issue with the well, the file with the data preceding the event will be also sent to the remote control device 300. For troubleshooting the well, the current history can be downloaded. As an example, a current near the idle current can show that the pump is worn out. The parameter V nominal in FIG. 4C is used to create an adjustment factor Mval to automatically eliminate the grid fluctuations impact on the calculation of H in method 4C. In general Mval is also used in the process shown in FIG. 6. If Im1.2<AWO is reached then the signal to turn-off relay 86 is sent. The background for the AWO1 signal is that at very low liquid levels the pump motor cannot create enough pressure to activate the pressure switch. Thus the pump can be running for hours as the liquid level need to reach a certain height before the pressure threshold is reached to turn off the pump motor. AWO is typically any current at 10% below the Imin value. FIG. 7 provides the flow chart for the process of shutting off the pump motor 204 as soon as the algorithms detect that the H is lower that the operator set parameter Hmin. In the event the water table in the well 208 is set at such a low level that the pump 205 is not able to turn-off the well through the pressure relay 86, the system will detect such condition based on the current calculations and compared to the AWO value in FIG. 6 that the pump is not pumping sufficient water to build up pressure to turn-off the pump 205 with the pressure sensor relay 86. This detection will initiate the turn-off of relay 106 and also activate an adjustable time delay before another turn-on cycle is attempted. If the current is sufficient to build enough pressure to activate the pressure relay 86 the relay will remain on.

While the novel features of the present invention have been described in terms of particular embodiments and preferred applications, it should be appreciated by one skilled in the art that substitution of materials and modification of details can be made without departing from the spirit of the invention as set forth in the following claims.

The invention claimed is:

1. An apparatus for monitoring the fluid level in a well provided with a pump and associated motor, the apparatus comprising:
   an electrical current sensor positioned outside of the well and connected to a phase wire of the pump, the current sensor operable to measure a current drawn by the associated motor and the current sensor providing a current signal responsive to the current drawn by the motor;
   a voltage sensor positioned outside of the well and connected to a phase wire of the pump and to a ground wire of the pump, the voltage sensor operable to measure a voltage across the associated motor and the voltage sensor providing a voltage signal responsive to the voltage across the motor;
   wherein the voltage sensor is connected between the phase wire and the ground wire; and
   a processor for processing the current signal and the voltage signal from the operation of the pump motor to obtain an adjusted current signal that is indicative of the motor operating condition, being based on the current signal normalized at each measurement interval by the simultaneous voltage signal in relation to a nominal pump motor voltage to eliminate the influence of fluctuating voltage on the measured current value,
      for using the adjusted current signal to obtain a value for the fluid height in the well using relationships of the current drawn under particular motor operating conditions and a known pump and motor specification data from a library to calculate the value for the fluid height;

and for taking at least one action based on the obtained fluid height, said at least one action including an action selected from the group of:
  sending instructions to turn-off and turn-on the pump motor,
  providing the obtained fluid height information to a monitor that stores a record of the liquid height over several monitoring intervals, and
  providing the obtained fluid height information to a remote control interface that displays information to an operator.

2. The apparatus of claim 1 further comprising:
a signal conditioner for smoothing the output of the said current sensor prior to presentation to said processor.

3. The apparatus of claim 1 wherein said processor further comprises
  a settable minimum well level parameter that acts to turn off said pump motor if the fluid level is below the set said minimum well level.

4. The apparatus of claim 3 wherein said processor further comprises: a settable timer activated after the pump motor turn-off activating the switch to turn-on the pump motor on after the set time of the timer is reached, wherein the setting of turn-on time determines the time before the turning-on the pump motor after the minimum well level threshold turned-off the pump motor and setting off an alert message after a defined number of unsuccessful attempts of turning on the pump motor due to insufficient pressure created by the pump motor due to low water level in the well whereas every attempt is conducted after the set turn-on time.

5. The apparatus of claim 1 further comprising:
  a wireless communication device that communicates with the processor to allow inputting information/parameters thereto;
  and said wireless communication device that communicates with wireless capable external control device being selected from the group of:
  dedicated remote control devices, and pre-existing wireless devices running a controller application.

6. The apparatus of claim 5 wherein said wherein said wireless communication device further comprises:
  a program to receive and enter the well and pump specifications and to generate from the library parameters needed to calculate the fluid height from the current signal.

7. The apparatus of claim 5, wherein said wireless communication device further comprises:
  said external control device having adjustable time parameter to turn-on the pump motor after the pump motor was turned-off after reaching a minimum water table.

8. The apparatus of claim 5, wherein said wireless communication device further comprises:
  said external control device having,
    Adjustable settings to determine minimum operation volts to turn off the pump motor; an emergency-off button to turn-off the pump motor; and
    a start button to turn-on the pump motor.

9. The apparatus of claim 1 wherein said processor further comprises:
  a monitor that stores a record of the flow and pressure over several monitoring intervals.

10. The apparatus of claim 1 wherein said processor further having a settable minimum current parameter that acts to turn off said pump motor with a parallel relay when the pump system cannot build up pressure to activate the pressure switch, adjustable time settings to determine the delay time before the next turn-on attempt is conducted after a turn-off occurred due to the measured current being lower than the minimum current setting.

11. The apparatus of claim 1 further comprising:
  a program to create a file that consecutively records and individually time stamps the liquid level values, current signals, voltage signals, in conjunction with the corresponding and adjustable measurement rate and makes these records available to the operator via said processor.

12. A method for monitoring the liquid level in a well serviced by an electrically-motorized pump, the method comprising the steps of:
  obtaining a current signal indicative of a current drawn by a motor of the electrically-motorized pump using a current sensor which is positioned outside of the well, the current sensor connected to a phase wire of the electrically-motorized pump;
  obtaining a voltage signal indicative of the voltage across the electrically-motorized pump using a voltage sensor which is positioned outside of the well, the voltage sensor connected to a phase wire and a ground wire of the electrically motorized pump;
  wherein the voltage sensor is connected between the phase wire and the ground wire;
  filtering the instantaneous current and voltage signals to remove transient fluctuations to obtain filtered signals
  processing the current signal and the voltage signal from the operation of the pump motor to obtain an adjusted current signal that is indicative of the motor operating condition, being based on the current signal normalized at each measurement interval by the simultaneous voltage signal in relation to a nominal pump motor voltage to eliminate the influence of fluctuating voltage on the measured current value,
  for using the adjusted current signal to obtain a value for the fluid height in the well using an analysis algorithm to calculate the fluid height from the current drawn under particular motor operating conditions and a known pump and motor specification data from a library;
  using the indicated fluid level to perform at least one of:
    controlling the power to the motor to turn it on and off responsive to the indicated fluid height,
    recording the indicated fluid level over a number of intervals, and
    presenting the indicated fluid level to an operator.

13. The method of claim 12 further comprising the step of:
creating specific manufacturer's fluid height versus current signal curves based on available design parameters of the motor and pump.

14. The method of claim 12 further comprising the step of:
adjusting the fluid versus height curves based on at least one of nominal current signal, nominal motor power, nominal well depth, and nominal allowable well depth operation.

15. The method of claim 12 further comprising the step of:
extracting operational parameters from specific manufacturer's data set library.

16. The method of claim 12 further comprising the step of:
Mathematically creating specific manufacturers fluid height versus flow curves based on available design parameters of the motor and pump directly from the measured current.

17. The method of claim 12 further comprising the step of:
Adjusting fluid height versus flow curves and current signal curves for a wide power range based on the current signal and the voltage signal from the operation of the inverter-controlled motor.

18. The method of claim 12 wherein the electrically-motorized pump uses a fixed speed motor, and the analysis algorithm calculates the fluid height from an efficiency of the electrically-motorized pump, an efficiency of the fixed speed motor, and the adjusted current.

19. The method of claim 12 wherein the electrically-motorized pump uses a fixed speed motor, and the analysis algorithm calculates the fluid height from at least one of a flow or a pressure derived from a measured power based on the adjusted current.

20. The method of claim 12 wherein the electrically-motorized pump uses a variable speed motor, and the analysis algorithm calculates the fluid height from a pressure measured directly from a pressure sensor and the adjusted current.

* * * * *